US009923652B2

(12) United States Patent
Lee et al.

(10) Patent No.: US 9,923,652 B2
(45) Date of Patent: Mar. 20, 2018

(54) FREQUENCY BAND SELECTION FOR MULTIPLE HOME NETWORKS

(75) Inventors: Ronald B. Lee, San Diego, CA (US); Edward Warner, San Diego, CA (US); Changwen Liu, San Diego, CA (US); Shaw Yuan, San Diego, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 120 days.

(21) Appl. No.: 13/584,541

(22) Filed: Aug. 13, 2012

(65) Prior Publication Data

US 2013/0039221 A1 Feb. 14, 2013

Related U.S. Application Data

(60) Provisional application No. 61/522,849, filed on Aug. 12, 2011.

(51) Int. Cl.
*H04L 12/50* (2006.01)
*H04H 20/63* (2008.01)

(52) U.S. Cl.
CPC .................................... *H04H 20/63* (2013.01)

(58) Field of Classification Search
CPC . H04L 5/0007; H04L 5/0048; H04L 27/2647; H04L 25/0204; H04L 27/2602; H04L 5/006; H04W 16/14; H04W 72/02; H04W 72/085; H04B 17/0077
USPC ............... 370/255, 480, 224, 474; 455/161.1
See application file for complete search history.

(56) References Cited

U.S. PATENT DOCUMENTS

2006/0020975 A1* 1/2006 Kenny ............. H04B 10/25751 725/63
2006/0133543 A1* 6/2006 Linsky et al. ................ 375/341
2008/0013612 A1 1/2008 Miller et al.
2008/0151790 A1* 6/2008 Lee ..................... H04L 12/2892 370/282
2008/0247334 A1* 10/2008 Lee ..................... H04L 12/2807 370/255
2008/0279219 A1* 11/2008 Wu et al. ...................... 370/474
(Continued)

FOREIGN PATENT DOCUMENTS

WO WO 2009044382 A2 * 4/2009 ......... H04L 12/2856

OTHER PUBLICATIONS

Jeff Baumgartner, MoCA Takes Spectrum Down a Notch, Apr. 20, 2010, Light Reading, p. 1 and 2.*
(Continued)

*Primary Examiner* — Andrew Chriss
*Assistant Examiner* — Atique Ahmed
(74) *Attorney, Agent, or Firm* — McAndrews, Held & Malloy, Ltd.

(57) ABSTRACT

A network-capable device is configured to: automatically detect the presence of a MoCA network (or other network, depending on the network protocol in the application environment), and configure itself for communication on that network at the appropriate communication frequencies. The network-capable device can be configured to create a new network (e.g., a new MoCA network) if there is no network broadcast signal within a band. Preferably, the network-capable device requires little or no user intervention to configure itself for operation at network operating frequencies or to create a new network where none is detected.

25 Claims, 12 Drawing Sheets

(56) References Cited

U.S. PATENT DOCUMENTS

| | | | | |
|---|---|---|---|---|
| 2008/0311938 | A1* | 12/2008 | Song | H04W 74/06 455/500 |
| 2009/0092154 | A1* | 4/2009 | Malik et al. | 370/480 |
| 2009/0161771 | A1* | 6/2009 | Schwoerer et al. | 375/260 |
| 2010/0091731 | A1* | 4/2010 | Kim et al. | 370/329 |
| 2010/0100918 | A1* | 4/2010 | Egan et al. | 725/111 |
| 2010/0105332 | A1* | 4/2010 | McHenry | H04W 16/14 455/62 |
| 2010/0125877 | A1* | 5/2010 | Wells | H04L 12/2801 725/78 |
| 2010/0142378 | A1* | 6/2010 | Matheney | H04L 12/2801 370/241 |
| 2010/0162329 | A1* | 6/2010 | Ford | H04L 12/2801 725/81 |
| 2011/0281543 | A1* | 11/2011 | White | H04H 20/63 455/337 |
| 2011/0292828 | A1* | 12/2011 | Kojina | H04L 12/2801 370/252 |

OTHER PUBLICATIONS

Light Reading MoCA Takes Spectrum Down a Notch LR Cable News Analysis Jeff Baumgartner Apr. 20, 2010.*

* cited by examiner

FREQUENCY BAND SELECTION FOR MULTIPLE HOME NETWORKS

CROSS-REFERENCE TO RELATED APPLICATIONS

This application claims the benefit of U.S. Provisional Application No. 61/522,849, filed Aug. 12, 2011 and which is hereby incorporated herein by reference in its entirety.

TECHNICAL FIELD

The present invention relates generally to communication systems, and more particularly, some embodiments relate to frequency detection and setup for home network nodes.

DESCRIPTION OF THE RELATED ART

A local network may include several types of devices configured to deliver subscriber services throughout a home, office or other like environment. These subscriber services include delivering multimedia content, such as streaming audio and video, to devices located throughout the location. As the number of available subscriber services has increased and they become more popular, the number of devices being connected to the home network has also increased. The increase in the number of services and devices increases the complexity of coordinating communication between the network nodes. This increase also generally tends to increase the amount and types of traffic carried on the network.

The network of FIG. 1 is one example of a multimedia network implemented in a home. In this example, a wired communications medium 100 is shown. The wired communications medium might be a coaxial cable system, a power line system, a fiber optic cable system, an Ethernet cable system, or other similar communications medium. Alternatively, the communications medium might be a wireless transmission system. As one example of a wired communication medium, with a Multimedia over Coax Alliance (MoCA®) network, the communications medium 100 is coaxial cabling deployed within a residence 101 or other environment. The systems and methods described herein are often discussed in terms of this example home network application, however, after reading this description, one of ordinary skill in the art will understand how these systems and methods can be implemented in alternative network applications as well as in environments other than the home.

The network of FIG. 1 comprises a plurality of network nodes 102, 103, 104, 105, 106 in communication according to a communications protocol. For example, the communications protocol might conform to a networking standard, such as the well-known MoCA standard. Nodes in such a network can be associated with a variety of devices. For example, in a system deployed in a residence 101, a node may be a network communications module associated with one of the computers 109 or 110. Such nodes allow the computers 109, 110 to communicate on the communications medium 100. Alternatively, a node may be a module associated with a television 111 to allow the television to receive and display media streamed from one or more other network nodes. A node might also be associated with a speaker or other media playing devices that play music. A node might also be associated with a module configured to interface with an internet or cable service provider 112, for example to provide Internet access, digital video recording capabilities, media streaming functions, or network management services to the residence 101. Also, televisions 107, set-top boxes 108 and other devices may be configured to include sufficient functionality integrated therein to communicate directly with the network.

With the many continued advancements in communications technology, more and more devices are being introduced in both the consumer and commercial sectors with advanced communications capabilities. The introduction of more devices onto a communication network can task the available bandwidth of communication channels in the network. For example, service providers such as satellite TV providers include MoCA enabled set-top boxes (STBs) and digital video recorders (DVRs) with their systems. By using a high-speed MoCA network to connect DVRs, STBs and broadband access points, the satellite TV providers offer multi-room DVR from a single box and allow access to the Internet to provide streaming video on demand.

With multiple different devices available to be connected to the physical coaxial cable plant in home networks (and like networks in other environments), different home networks may be operating at different frequencies. Accordingly, network nodes must traditionally be configured in advance for communication on a network operating in a given frequency band. For example, a satellite set-top box conducting network communications over a coaxial network typically operates in a different frequency band than a cable set-top box. Therefore, a network capable device must be configured to conduct network communications in the right frequency band or it will not be compatible with the communication network.

BRIEF SUMMARY OF EMBODIMENTS OF THE INVENTION

According to embodiments of the systems and methods described herein, various configurations for a network-capable device are provided. In various embodiments, the network-capable device is operable to automatically detect the operating frequency of a communication network with which it is integrated, and configure itself to enable proper operation of the device on that network. Preferably, the network-capable device is implemented to configure itself in this fashion without requiring the user to have any knowledge of what frequency the network may be operating on.

Accordingly, in various embodiments, the network-capable device is configured to: automatically detect the presence of a MoCA network (or other network, depending on the network protocol in the application environment), and configure itself for communication on that network at the appropriate communication frequencies. In some embodiments, the network-capable device attempts to create a new network (e.g., a new MoCA network) if there is no network broadcast signal within a band. Preferably, the network-capable device requires little or no user intervention to configure itself for operation at network operating frequencies or to create a new network where none is detected. In other embodiments, the user may be allowed or required to intervene in the process to perform functions such as, for example, enter a password, restrict operation to a specific band, allow or disallow network creation, override nominal operations, or other necessary or desirable user features.

According to various embodiments, systems and methods for self-configuring a network device for operation on a frequency band of a plurality bands are provided. The process in some embodiments includes a network device scanning a plurality of communication channels in the plurality of frequency bands to detect the presence of signals on one or more of the plurality of communication channels.

Upon detecting a signal on a first communication channel, a processor in the network device determines whether the signal is a network beacon, or non-network signal energy. Where a network beacon is detected on the first communication channel, the network device attempts to join the network on that channel.

The network device can be configured to add the first communication channel to a list of banned channels (e.g., a skip channel list) where non-network signal energy is detected on the first communication channel. The skip channel list can be updated and augmented each time non-network signal energy is detected on a subsequent communication channel.

In some embodiments, the non-network signal energy is energy detected on a channel that is greater than a threshold amount above a determined noise floor for that channel. The energy detection can be configured to differentiate between satellite or cable TV signals and noise signals. For example, the detection algorithm can be configured to differentiate between satellite TV signals and ATSC signals.

In various embodiments, determining whether the signal is non-network signal energy in the E Band, includes the operation of discriminating between cable TV and ATSC ingress signals by detecting presence of a signal above a predetermined signal level, and identifying a signal lower than a second predetermined level as a false detection. For example, for discriminating between cable TV and ATSC ingress signals, the system may be configured to detect the presence of a signal above a threshold chosen from a range of thresholds, wherein the range can be in some embodiments from −40 dBm to −70 dBm. In another embodiment, the system may be configured to detect the presence of a signal above a threshold chosen from a range of thresholds, wherein the range can be from −50 dBm to −60 dBm. In still another embodiment, the system may be configured to detect the presence of a signal above a threshold chosen from a range of thresholds, wherein the range can be from −55 dBm to −60 dBm. In still a further embodiment, the system may be configured to detect the presence of a signal greater than or equal to −57 dBm, −58 dBm, or −59 dBm in 20 MHz. Additionally, for discriminating between cable TV and ATSC ingress signals, the system may be configured to treat the presence of a signal below a threshold as a false detection, wherein the threshold is chosen to be within the range of −50 dBM to −80 dBm. In another embodiment, the system may be configured to treat the presence of a signal below a threshold as a false detection, wherein the threshold is chosen to be within the range of −60 dBM to −70 dBm. In still another embodiment the system may be configured to treat the presence of a signal below a threshold as a false detection, wherein the threshold is chosen to be within the range of −65 dBM to −70 dBm. In still another embodiment, the system may be configured to treat the presence of a signal as a false detection when this signal is less than −67 dBm, −68 dBm, or −69 dBm in 20 MHz.

In other embodiments, determining whether the signal is non-network signal energy in the D Band, includes the operation of detecting presence of a signal above a predetermined signal level, and identifying a signal lower than a second predetermined level as a false detection. For example, for discriminating between cable TV and ATSC ingress signals, the system may be configured to detect the presence of a signal above a threshold chosen from a range of thresholds, wherein the range can be in some embodiments from −50 dBm to −80 dBm. In another embodiment, the system may be configured to detect the presence of a signal above a threshold chosen from a range of thresholds, wherein the range can be from −60 dBm to −70 dBm. In still another embodiment, the system may be configured to detect the presence of a signal above a threshold chosen from a range of thresholds, wherein the range can be from −65 dBm to −70 dBm. In still a further embodiment, the system may be configured to detect the presence of a signal greater than or equal to −68 dBm, −69 dBm, or −70 dBm in 20 MHz. Additionally, for discriminating between cable TV and ATSC ingress signals, the system may be configured to treat the presence of a signal below a threshold as a false detection, wherein the threshold is chosen to be within the range of −60 dBm to −90 dBm. In another embodiment, the system may be configured to treat the presence of a signal below a threshold as a false detection, wherein the threshold is chosen to be within the range of −70 dBm to −80 dBm. In still another embodiment, the system may be configured to treat the presence of a signal below a threshold as a false detection, wherein the threshold is chosen to be within the range of −75 dBm to −80 dBm. In still another embodiment, the system may be configured to treat the presence of a signal as a false detection when this signal is less than −78 dBm, −79 dBm, or −80 dBm in 20 MHz.

If a scanned communication channel is in one frequency band (e.g., D Band) and non-network energy is detected in that channel, the network device can be configured to add all the channels in the frequency band of the first communication channel (e.g. all channels in the D Band) to the skip channel list.

In some embodiments, the network beacon is a MoCA beacon and the process further includes the operation of updating a list of Taboo or banned channels when a MoCA beacon is detected on the first communication channel.

The network device can further be configured to enter a Beacon Phase for one or more of the plurality of frequency bands in order to form or join a network on a communication channel.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the accompanying figures. The drawings are provided for purposes of illustration only and merely depict typical or example embodiments of the invention. These drawings are provided to facilitate the reader's understanding of the systems and methods described herein and shall not be considered limiting of the breadth, scope, or applicability of the claimed invention.

Figure 1:
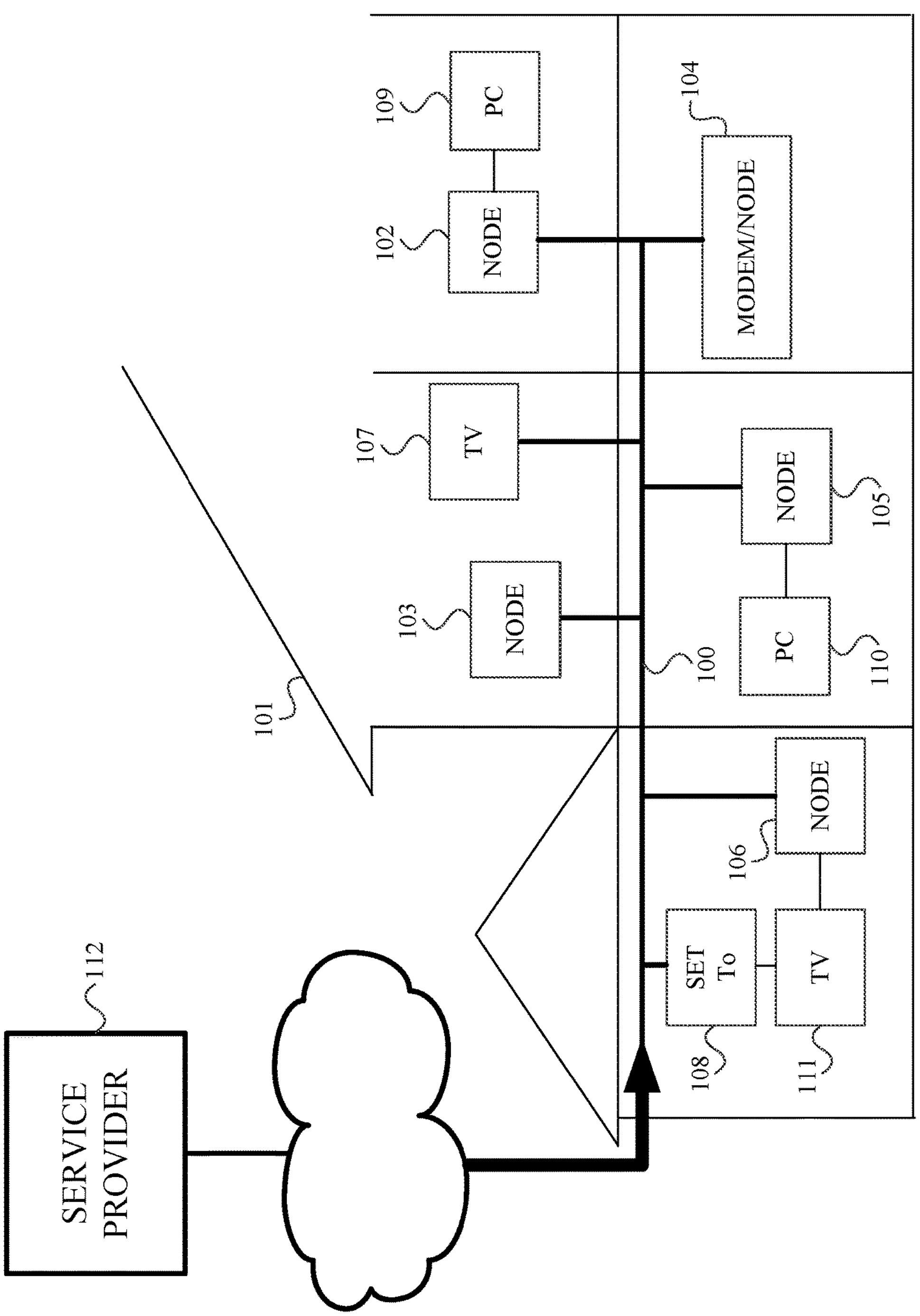
FIG. 1 is a diagram illustrating one example of a home network environment with which the systems and methods described herein can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

According to embodiments of the systems and methods described herein, various configurations for a network-capable device are provided. In various embodiments, the network-capable device is operable to automatically detect the operating frequency of a communication network that it can join or form, and configure itself to enable proper operation of the device on that network. Preferably, the network-capable device is implemented to configure itself in this fashion without requiring the user to have any knowledge of what frequency the network may be operating on.

Accordingly, in various embodiments, the network-capable device is configured to: automatically detect the presence of a MoCA network (or other network, depending on the network protocol in the application environment), and configure itself for communication on that network at the appropriate communication frequencies (or avoid that network if not a MoCA network). In some embodiments, the network-capable device attempts to create a new network (e.g., a new MoCA network) if there is no network broadcast signal within a frequency channel. Preferably, the network-capable device requires little or no user intervention to configure itself for operation at network operating frequencies or to create a new network where none is detected. In other embodiments, the user may be allowed or required to intervene in the process to perform functions such as, for example, enter a password, restrict operation to a specific band, allow or disallow network creation, override nominal operations, or other necessary or desirable user features.

The scanning algorithm used for network devices can be implemented with two phases—a Listening Phase and a Beacon Phase. In the Listening Phase, the device traverses through the band(s). The network device in some embodiments can be configured to listen for an individual band only, or for a predetermined group of bands. If a network is detected in the Listening Phase, the device can try to join the network. In the Beacon Phase, the network device makes use of the results generated from the Listening Phase and tries to form its own network if it cannot join any existing network. If a network is detected in the Beacon Phase, the device can still try to join the network. In various embodiments, during the Listening Phase and the Beacon phase, the network device uses a scan list to scan network channels. Examples of such a scan list are provided in Tables 1A, 1B, 2A, 2B, 3A and 3B (collectively referred to as Tables 1-3), which are discussed in detail below.

In the Listening Phase, the network device in some embodiments can be configured to listen for an individual band or for a predetermined group of bands. For example, the device can be configured to listen to Band D only, Band E only, or both Band D and Band E. When configured in a specific band mode, the device attempts to join the designated Band with the configured privacy parameter on each band. In various embodiments, when configured in a specific band mode, the device attempts to join the designated Band using the same process used by a conventional device configured for single-band operation. For example, for a device configured for operation in a given network, the device is configured to be compliant with applicable network specifications for single band operation in that network. As a further example, for a device configured for operation in MoCA networks, the device is configured for the Listening Phase so as to be compliant with MoCA specifications for single band operation in a MoCA network.

In one embodiment, when configured for multi-band operation, the device is configured to use this conventional Listening Phase process as part of the dual-band Listening Phase. In other words, in one embodiment, when configured for operation on both Band D and Band E, the process followed by the device is an extension to and generalization of the conventional process used by devices for the listening phase in the applicable network environment. For example, in one embodiment, the listening phase uses as the scanned Channel List a union of Band D and Band E. Channel scanning orders can be determined and implemented in any of a number of ways. Examples of channel scanning orders are provided below in Tables 1-3. In Tables 1-3, the last operating frequency is identified as "LOF."

Tables 1A and 1B illustrate examples of a Network Search Channel Picking Order for operations in Joint D and E bands, where the last operating frequency is in the E Band. In the example of Table 1A, the last operating frequency is checked first. If no signal is detected on the last operating frequency, channel E1 is selected and checked. If no signal is detected on channel E1, the last operating frequency is checked again. If no signal is detected on the last operating frequency, channel E2 is selected and checked. This process continues, alternating between the last operating frequency channel and successive channels in the E and D Bands until a signal is detected on a channel. Or, if no signal is detected, the scanning can repeat or the network device can attempt to initiate its own network.

TABLE 1A

Network Search Channel Picking Order in Joint Band D and Band E if LOF is in Band E

| Step | Channel |
|---|---|
| 1 | LOF |
| 2 | E1 |
| 3 | LOF |
| 4 | E2 |
| 5 | LOF |
| 6 | E3 |
| 7 | LOF |
| 8 | E4 |
| 9 | LOF |
| 10 | E5 |

TABLE 1A-continued

| Network Search Channel Picking Order in Joint Band D and Band E if LOF is in Band E | |
|---|---|
| Step | Channel |
| 11 | LOF |
| 22 | D1 |
| 13 | LOF |
| 14 | D2 |
| 15 | LOF |
| 16 | D3 |
| 17 | LOF |
| 18 | D4 |
| 19 | LOF |
| 20 | D5 |
| 21 | LOF |
| 22 | D6 |
| 23 | LOF |
| 24 | D7 |
| 25 | LOF |
| 26 | D8 |
| 27 | LOF |
| 28 | D7 |
| 29 | LOF |
| 30 | D6 |
| 31 | LOF |
| 32 | D5 |
| 33 | LOF |
| 34 | D4 |
| 35 | LOF |
| 36 | D3 |
| 37 | LOF |
| 38 | D2 |
| 39 | LOF |
| 40 | D1 |
| 41 | LOF |
| 42 | E5 |
| 43 | LOF |
| 44 | E4 |
| 45 | LOF |
| 46 | E3 |
| 47 | LOF |
| 48 | E2 |
| 49 | LOF |
| 50 | E1 |

Table 1B provides an alternative Network Search Channel Picking Order for operations in Joint Band D and Band E where the last operating frequency is in the E Band. In the example of Table 1B, the last operating frequency and the scanning alternates between the last operating frequency and the other channels on the D and E Bands. This is similar to the example shown in Table 1A. Because the last operating frequency is in the E Band, the scanning focuses on the E Band first, and conducts 2 scans of the E Band before proceeding to the D Band.

TABLE 2B

| Alternative Network Search Channel Picking Order in Joint Band D and Band E if LOF is in Band E | |
|---|---|
| Step | Channel |
| 1 | LOF |
| 2 | E5 |
| 3 | LOF |
| 4 | E4 |
| 5 | LOF |
| 6 | E3 |
| 7 | LOF |
| 8 | E2 |
| 9 | LOF |
| 10 | E1 |
| 11 | LOF |
| 22 | E2 |
| 13 | LOF |
| 14 | E3 |
| 15 | LOF |
| 16 | E4 |
| 17 | LOF |
| 18 | E5 |
| 19 | LOF |
| 20 | D1 |
| 21 | LOF |
| 22 | D2 |
| 23 | LOF |
| 24 | D3 |
| 25 | LOF |
| 26 | D4 |
| 27 | LOF |
| 28 | D5 |
| 29 | LOF |
| 30 | D6 |
| 31 | LOF |
| 32 | D7 |
| 33 | LOF |
| 34 | D8 |
| 35 | LOF |
| 36 | D7 |
| 37 | LOF |
| 38 | D6 |
| 39 | LOF |
| 40 | D5 |
| 41 | LOF |
| 42 | D4 |
| 43 | LOF |
| 44 | D3 |
| 45 | LOF |
| 46 | D2 |
| 47 | LOF |
| 48 | D1 |

In the examples of Tables 1A and 1B, the last operating frequency was in Band E, and therefore, the E Band is scanned before the D Band because it is statistically more likely that a signal, if any, will be found in the E Band. Tables 2A and 2B are examples illustrating a scan order where operation is in D or E Band and the last operating frequency was in the D Band. In the Examples of Tables 2A, and 2B, the last operating frequency is checked first. If no signal is detected on the last operating frequency, channel D1 is selected and checked. If no signal is detected on channel D1, the last operating frequency is checked again. If no signal is detected on the last operating frequency, channel D2 is selected and checked. This process continues, alternating between the last operating frequency channel and successive channels in the D and E Bands until a signal is detected on a channel. Or, if no signal is detected, the scanning can repeat or the network device can attempt to initiate its own network.

TABLE 3A

| Network Search Channel Picking Order in Joint Band D and Band E if LOF is in Band D | |
|---|---|
| Step | Channel |
| 1 | LOF |
| 2 | D1 |
| 3 | LOF |
| 4 | D2 |
| 5 | LOF |
| 6 | D3 |

TABLE 3A-continued

| Network Search Channel Picking Order in Joint Band D and Band E if LOF is in Band D | |
|---|---|
| Step | Channel |
| 7 | LOF |
| 8 | D4 |
| 9 | LOF |
| 0 | D5 |
| 11 | LOF |
| 12 | D6 |
| 13 | LOF |
| 14 | D7 |
| 15 | LOF |
| 16 | D8 |
| 17 | LOF |
| 18 | E1 |
| 19 | LOF |
| 20 | E2 |
| 21 | LOF |
| 22 | E3 |
| 23 | LOF |
| 24 | E4 |
| 25 | LOF |
| 26 | E5 |
| 27 | LOF |
| 28 | E4 |
| 29 | LOF |
| 30 | E3 |
| 31 | LOF |
| 32 | E2 |
| 33 | LOF |
| 34 | E1 |
| 35 | LOF |
| 36 | D8 |
| 37 | LOF |
| 38 | D7 |
| 39 | LOF |
| 40 | D6 |
| 41 | LOF |
| 42 | D5 |
| 43 | LOF |
| 44 | D4 |
| 45 | LOF |
| 46 | D3 |
| 47 | LOF |
| 48 | D2 |
| 49 | LOF |
| 50 | D1 |

TABLE 4B

| Network Search Channel Picking Order in Joint Band D and Band E if LOF isin Band D | |
|---|---|
| Step | Channel |
| 1 | LOF |
| 2 | D1 |
| 3 | LOF |
| 4 | D2 |
| 5 | LOF |
| 6 | D3 |
| 7 | LOF |
| 8 | D4 |
| 9 | LOF |
| 10 | D5 |
| 11 | LOF |
| 12 | D6 |
| 13 | LOF |
| 14 | D7 |
| 15 | LOF |
| 16 | D8 |
| 17 | LOF |
| 18 | D7 |
| 19 | LOF |
| 20 | D6 |

TABLE 4B-continued

| Network Search Channel Picking Order in Joint Band D and Band E if LOF isin Band D | |
|---|---|
| Step | Channel |
| 21 | LOF |
| 22 | D5 |
| 23 | LOF |
| 24 | D4 |
| 25 | LOF |
| 26 | D3 |
| 27 | LOF |
| 28 | D2 |
| 29 | LOF |
| 30 | D1 |
| 31 | LOF |
| 32 | E5 |
| 33 | LOF |
| 34 | E4 |
| 35 | LOF |
| 36 | E3 |
| 37 | LOF |
| 38 | E2 |
| 39 | LOF |
| 40 | E1 |
| 41 | LOF |
| 42 | E2 |
| 43 | LOF |
| 44 | E3 |
| 45 | LOF |
| 46 | E4 |
| 47 | LOF |
| 48 | E5 |

In the examples of Tables 1A, 1B, 2A and 2B, the first band scanned in an interleaved fashion with the last operating frequency is the band in which the last operating frequency existed. The D and E Bands are shown as being scanned in successive channel order, from Channel 1 to N (or N to 1) in each band. As would be apparent to one of ordinary skill in the art after reading this description, other scan orders can be selected and used.

Tables 3A and 3B provide example implementations in which there was no last operating frequency, or in which sufficient time since the last operation has elapsed that the last operating frequency is disregarded. In the embodiment described in Table 3A, the channels of the D Band are scanned first, and then E Band channels are scanned. In the embodiment described in Table 3B, the channels of the D and E Band are successively scanned, in order, to search for an activity on a channel. Again, As would be apparent to one of ordinary skill in the art after reading this description, other scan orders can be selected and used.

TABLE 5A

| Network Search Channel Picking Order in Joint Band D and Band E if LOF is NULL | |
|---|---|
| Step | Channel |
| 1 | D1 |
| 2 | D2 |
| 3 | D3 |
| 4 | D4 |
| 5 | D5 |
| 6 | D6 |
| 7 | D7 |
| 8 | D8 |
| 9 | D7 |
| 10 | D6 |
| 11 | D5 |
| 12 | D4 |
| 13 | D3 |

TABLE 5A-continued

| Network Search Channel Picking Order in Joint Band D and Band E if LOF is NULL | |
|---|---|
| Step | Channel |
| 14 | D2 |
| 15 | D1 |
| 16 | E5 |
| 17 | E4 |
| 18 | E3 |
| 19 | E2 |
| 20 | E1 |
| 21 | E2 |
| 22 | E3 |
| 23 | E4 |
| 24 | E5 |

TABLE 6B

| Network Search Channel Picking Order in Joint Band D and Band E if LOF is NULL | |
|---|---|
| Step | Channel |
| 1 | D1 |
| 2 | D2 |
| 3 | D3 |
| 4 | D4 |
| 5 | D5 |
| 6 | D6 |
| 7 | D7 |
| 8 | D8 |
| 9 | E1 |
| 10 | E2 |
| 11 | E3 |
| 12 | E4 |
| 13 | E5 |
| 14 | E4 |
| 15 | E3 |
| 16 | E2 |
| 17 | E1 |
| 18 | D8 |
| 19 | D7 |
| 20 | D6 |
| 21 | D5 |
| 22 | D4 |
| 23 | D3 |
| 24 | D2 |
| 25 | D1 |

In various embodiments, the device is configured such that it does not scan the same channel twice consecutively as in the MoCA specifications. Table 8 shows an example of this. In the example of Table 4, E4 was the last operating frequency. Accordingly the E Band channels are successively scanned in a manner such that they are interleaved with E4, the last operating frequency. Because every other scan scans E4, E4 needs not be scanned when it comes up on its rotation in the successive channel order. Accordingly, the successive channels interleaved with the last operating frequency skip the last operating frequency (E4), resulting in the order shown in the examples of Tables 4A and 4B.

As seen in steps 42 and 8 of Table 4A, and in steps 4 and 14 of Table 4B, the network device does not scan E4 in its normal rotation, but instead skips to scanning E3 and E5, respectively.

TABLE 7

| Network Search Channel Picking Order in Band E when LOF = E4 | |
|---|---|
| Step | Channel |
| 1 | E4 |
| 2 | E1 |
| 3 | E4 |
| 4 | E2 |
| 5 | E4 |
| 6 | E3 |
| 7 | E4 |
| 8 | E5 |
| 19 | E4 |
| 10 | D1 |
| 11 | E4 |
| 12 | D2 |
| 13 | E4 |
| 14 | D3 |
| 15 | E4 |
| 16 | D4 |
| 17 | E4 |
| 18 | D5 |
| 19 | E4 |
| 20 | D6 |
| 21 | E4 |
| 22 | D7 |
| 23 | E4 |
| 24 | D8 |
| 25 | E4 |
| 26 | D7 |
| 27 | E4 |
| 28 | D6 |
| 29 | E4 |
| 30 | D5 |
| 31 | E4 |
| 32 | D4 |
| 33 | E4 |
| 34 | D3 |
| 35 | E4 |
| 36 | D2 |
| 37 | E4 |
| 38 | D1 |
| 39 | E4 |
| 40 | E5 |
| 41 | E4 |
| 42 | E3 |
| 43 | E4 |
| 44 | E2 |
| 45 | E4 |
| 46 | E1 |

TABLE 8

| Network Search Channel Picking Order in Band E when LOF = E4 | |
|---|---|
| Step | Channel |
| 1 | E4 |
| 2 | E5 |
| 3 | E4 |
| 4 | E3 |
| 5 | E4 |
| 6 | E2 |
| 7 | E4 |
| 8 | E1 |
| 9 | E4 |
| 10 | E2 |
| 11 | E4 |
| 12 | E3 |
| 13 | E4 |
| 14 | E5 |
| 15 | E4 |
| 16 | D1 |
| 17 | E4 |
| 18 | D2 |
| 19 | E4 |
| 20 | D3 |

TABLE 8-continued

Network Search Channel Picking Order in Band E when LOF = E4

| Step | Channel |
|---|---|
| 21 | E4 |
| 22 | D4 |
| 23 | E4 |
| 24 | D5 |
| 25 | E4 |
| 26 | D6 |
| 27 | E4 |
| 28 | D7 |
| 29 | E4 |
| 30 | D8 |
| 31 | E4 |
| 32 | D7 |
| 33 | E4 |
| 34 | D6 |
| 35 | E4 |
| 36 | D5 |
| 37 | E4 |
| 38 | D4 |
| 39 | E4 |
| 40 | D3 |
| 41 | E4 |
| 42 | D2 |
| 43 | E4 |
| 44 | D1 |

Note that although the above examples illustrate a scan order alternating a successively scanned channel with the last operating frequency, other embodiments contemplate different interleaving ratios for the last operating frequency. For example, rather than interleaving the last operating frequency in the scan order for every second step, the last operating frequency can be interleaved into the scan order every M steps, where M=3, 4, 5, 6, or some other integer value. Preferably, M is less than the total number of channels scanned, such that the last operating frequency is scanned more frequently than once in the entire rotation.

In some embodiments, non-MoCA signal detection is also performed at each scanning channel. This can be performed during the Listening Phase, at the same time as the Beacon detection, or immediately before or after the Beacon detection. This signal detection can be performed on each picked channel exactly once, or a determined number of times. If a non-MoCA signal (e.g. Sat TV signal, Cable TV signal, et al) is detected at a channel for a pre-determined number of times (e.g. one time only, two times, five times, etc. as determined for avoiding misdetection), then the appropriate channels are added to a 'Skip Channel List,' which is a list of channels skipped for network setup. Because Band D is typically associated with Satellite TV signals, and satellite TV signals generally span the entire Band D, if a non-MoCA signal is detected on Band D the channels of the entire Band D are added to the Skip Channel List. On the other hand, if a non-MoCA signal is detected on Band E, only the channel on which the signal is detected is added to the Skip Channel List.

In some embodiments, the device is set to listen for a predetermined time before moving on to the next channel. In one embodiment, this time is set to a time value between 12 seconds and 20 seconds; and for Intermediate Devices, it is set to a time value between 160 seconds and 195 seconds.

Detecting existing service, such as cable TV, satellite, etc., is useful for avoiding service disruptions when forming a MoCA (or other) network. When no MoCA beacon is detected in the Listening Phase, the detection algorithm in one embodiment detects existing service while ignoring ingress noise such as ATSC (Advanced Television Systems Committee) that are expected to be at lower power levels. In other words, the Listening Phase also checks for the presence of cable TV, satellite or other service signals at a predetermined threshold above the noise floor.

Detecting non-MoCA signals during the network search process can be accomplished using a spectrum analyzer. Accordingly, in some embodiments, the network device is configured to include a spectrum analyzer. The receive gain setting should be set such that the lowest expected existing service signal can be reliably detected. For each search frequency band, the noise floor may be measured using the desired gain setting with the receiver isolated as much as possible from the input. This will allow the receiver to reliably measure the system noise. Once the system noise is calibrated, the power detected by the spectrum analyzer can be compared with the calibrated noise level for that band.

Figure 5:
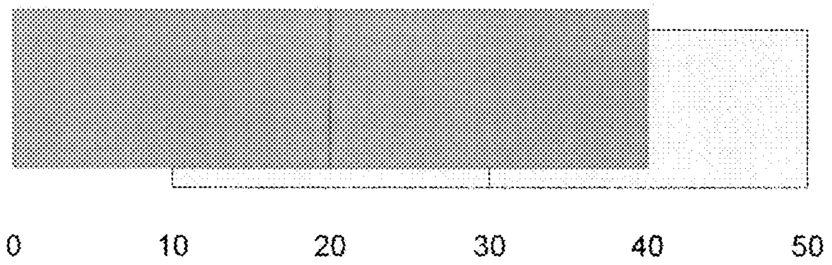
FIG. 5 is a diagram illustrating overlapping analysis of 20 MHz bins for SNR calculations in accordance with one embodiment of the systems and methods described herein.

For operations in Band E, the detection algorithm is configured to discriminate between CATV and ATSC ingress. The distinguishing features between CATV and ATSC ingress are that CATV spectrum is more fully occupied and typically higher powered than ATSC ingress. On the other hand, ATSC is sparsely populated and limited to 6 MHz or less bandwidth. Accordingly, the detection criterion can be summarized as follows:

- System must detect presence of signal ≥−58 dBm in 20 MHz
- Misdetection probability should be <1%
- False detection of signal lower than −68 dBm in 20 MHz is acceptable For signal detection in Band D, the detection algorithm is straight forward because no ATSC ingress is expected. Any signal detected in this band can be considered to be existing service and is preferably avoided. The detection threshold can be set to slightly below the lowest expected operating SNR. A simplified detection criterion is as follows:

- System must detect presence of signal ≥−69 dBm in 20 MHz
- Misdetection probability should be <1%
- 20 MHz signal may straddle two non-overlapping MoCA channels
- False detection of signal lower than −80 dBm in 20 MHz is acceptable With this sort of detection criteria, signal detection is based on signal SNR measured in a 20 MHz band, or 102 MoCA subcarriers. Overlapping analysis of 20 MHz bins as shown in FIG. 5 can be used for SNR calculations. In this example, 10 MHz overlap is used, but finer or coarser resolutions may be used. Finer resolution provides more accurate SNR measurements.

Figure 6:
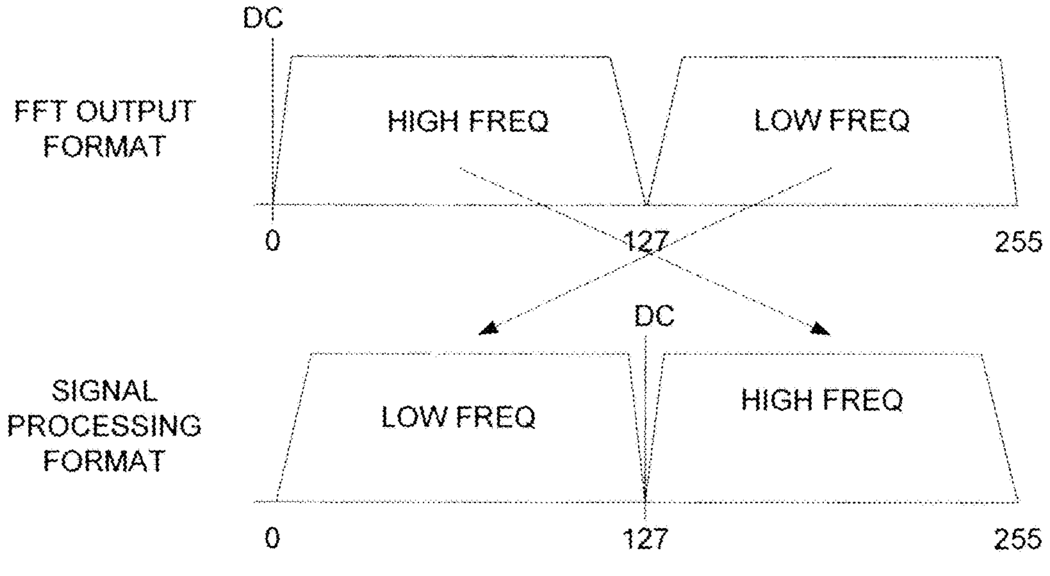
FIG. 6 is a diagram illustrating data rearrangement in accordance with one embodiment of the systems and methods described herein.

In various embodiments, when the spectrum analyzer data is first read, the data is arranged such that the signal detection is performed from the lowest frequency to the highest frequency. Due to the FFT wrap around, the index of the received data is such that bin 128 is the lowest frequency, bin 127 is the highest frequency, and bin 0 is at band center. For convenience of algorithm description and presentation, it is assumed the data is rearranged as shown in FIG. 6 for signal processing. In reality, however, in various embodiments, the data processing starts at bin 128 and wrap around to bin 127. When multiple packets of spectrum analyzer data is collected, the sum of the energy measured in the respective subcarriers is used for signal detection:

$$SA_i = \sum_{pkt=1}^{numPkt} SA_{i,pkt}, \text{ for } i = 0:255$$

It is assumed that both signal and noise measurements contain the same number of packets and each packet accumulates over 20 OFDM symbols stored in unsigned 32 bit integer. Subsequent data processing is performed in one embodiment using unsigned 32 bit integer with the parameter listed in Table 5.

TABLE 5

Detection Algorithm Parameters for MoCA Applications

| Parameter | Value | Description |
|---|---|---|
| numPkts | 10 | Number of packets spectrum analyzer data. |
| numBands | TBD | Number of 20 MHz (102 subcarriers) analysis bands |
| detThresh | TBD | Signal detection threshold. This will be different for Band D and E |

The input to the processing software may also include a parameter that specifies the number of overlapping 20 MHz analysis bands (102 MoCA subcarriers). The starting index of each analysis band is, in one embodiment, approximately evenly distributed over the 50 MHz search band with 154 being the last starting index. The starting index of the $m^{th}$ analysis band is computed as $$\text{startIndex}=\text{floor}((154*m/(\text{numBands}-1)) \text{ for } m=0:\text{numBands}-1.$$

The energy in each analysis band is computed by summing spectrum analyzer output, SA, over 102 subcarriers $$P_m = \sum_{i=startIndex}^{startIndex+101} SA_i, \text{ for } m = 0 : N-1.$$

Two sets of spectrum analyzer measurements can be used: one set for noise power measurement; and the other for signal+noise measurement. In this case, the SNR is computed as $$SNR=10*\log 10((P_{s+n}-P_n)/P_n),$$

where $P_n$ is the noise power measurement when the receiver is isolated from the input and $P_{s+n}$ is the power measurement when the receiver is connected to the input. Alternatively, linear thresholds can be used to simplify calculations. Accordingly, in some embodiments, the equivalent detection criteria is $$(Ps+n-Pn)>\text{detThresh}*Pn,$$

where detThresh is the detection threshold in linear scale. It is not expected that the right hand side of the inequality, detThresh*$P_n$, would overflow for the expected detection threshold.

If the device can join an existing network during the Listening Phase, it completes its network search without proceeding to the Beacon Phase. Otherwise, the device can progress to the Beacon Phase. In the Beacon Phase, the device traverses through the configured Bands and attempts to join existing networks or to send its beacons to form its own network. In some embodiments, the beacons are sent with the appropriately configured privacy parameters on each band. In various embodiments, for operation Band D only, the process follows the Beacon Phase as specified in “MoCA MAC/PHY SPECIFICATION v1.0”, November, 2007. Similarly, for operation in E Band only, the process follows the Phase 2 specified in “MoCA-1_1-Extentions-Band-E-v100714”, July 2010.

In various embodiments, where the operation is in Band D and Band E, if four or more channels in Band E are placed in the Skip Channel List, the process operates as a Band D only process and follows the Beacon Phase specified in “MoCA MAC/PHY SPECIFICATION v1.0”, November, 2007. Otherwise, the process operates as a dual-band process and the Beacon Phase is implemented in some embodiments as an extension to Phase 2 of the Network Search Algorithm specified in “MoCA-1_1-Extentions-Band-E-v100714”, July 2010, with changes as now described. If the last operating frequency is NULL and the Skip Channel List is empty, the last operating frequency is set to D1, although other channels could be selected for this setting.

In the dual band mode, the Channel List may be defined as a union of the Channel List in Band E and the Channel List in Band D. In some embodiments, the channel picking order as defined in Tables 1-3, although other channel picking orders can be specified.

Also, in dual-band mode, when the tuned frequency (MHz) is in Band D, the TABOO_CHN_MASK_START and the TABOO_CHN_MASK fields of broadcasted Beacons are the same as these specified in the network search algorithm in “MoCA MAC/PHY SPECIFICATION v1.0”, November, 2007.

Also, in dual-band mode, beacon channels can be configured as being programmable and configurable by a user via a user interface on which channel(s) of Band D and Band E are Beacon Channels. In some embodiments, the following constraints can be applied: (1) Band E has exactly one Beacon Channel with E4 as the default; and (2) Band D has at least one Beacon Channel with D1-D8 as the default set of Beacon Channels in Band D. In addition, the last operating frequency in Band D (if not NULL) is always a Beacon Channel, unless otherwise configured by the user.

The listening and Beacon Phases described above can be repeated if a network device is unable to locate and join a network or to form a new network with other nodes. In one embodiment, the Beacon Phase can be repeated for a predetermined number of times until the device is either able to join a network or to form a new network with other nodes. After that, the node may either abort its network search or restart the network search from the Listening Phase again. In one embodiment, the Beacon Phase is repeated nine more times, for a total of ten Beacon Phases, unless the device is either able to join a network or to form a new network with other nodes. In other embodiments, the number of times the Beacon Phase is performed is less than or greater than 10.

Figure 2:
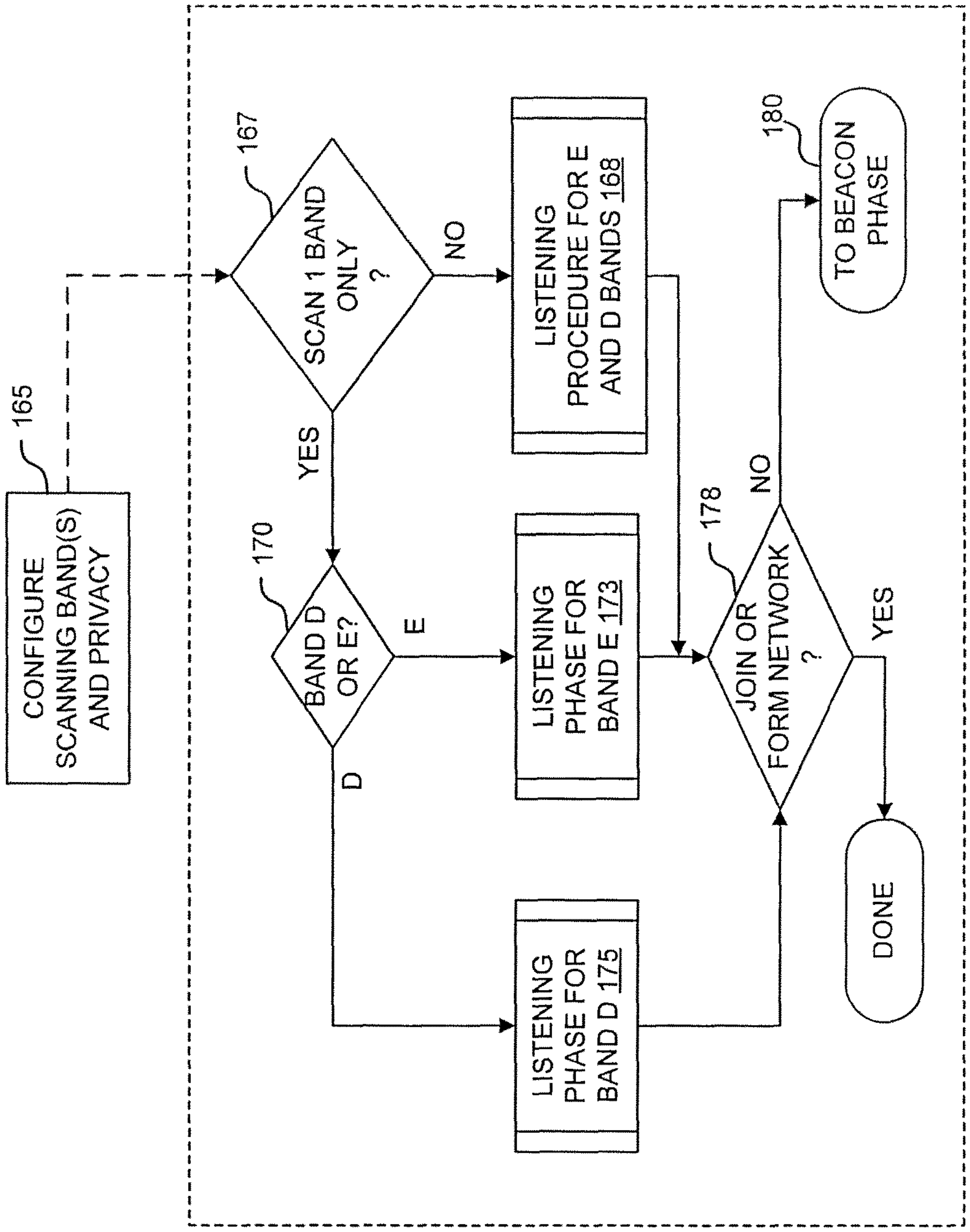
FIG. 2 is a diagram illustrating an example process for the Listening Phase in accordance with one embodiment of the systems and methods described herein.

FIG. 2 is a diagram illustrating an example process for the Listening Phase in accordance with one embodiment of the systems and methods described herein. Referring now to FIG. 2, at operation 165, the scanning bands and privacy settings are configured. In this step, it is determined which of the bands the device will be configured to listen to. As noted above, the Listening Phase can be implemented to listen to one or more of a plurality of bands. In the above-described example, the plurality of bands comprises the D Band and the E Band, and the device is configured to listen to either or both of these bands. FIG. 2 (as well as FIGS. 3 and 4) follow this example. After reading this description, one of ordinary skill in the art will understand how these processes can be implemented with other frequency bands or other quantities of frequency bands.

With continued reference to FIG. 2, the device determines whether it is configured to scan 1 band, or more than one band. This is illustrated by operation decision block 167. If more than one band is being configured for scanning, operation continues at block 168 where the multi-band listening procedure is performed to listen for network activity in both bands. In one embodiment, the listening is performed with a channel list that is a union of D Band and E Band channels, and the channel scanning orders in various embodiments are provided above in Tables 1-3. As would be appreciated by one of ordinary skill in the art after reading this description, alternative channel scanning orders can be used.

On the other hand, where operation is in one band (an affirmative result at decision block 167), the network node determines which of the plurality of bands it is going to be operating in. This is illustrated by decision block 170. This decision may be determined based on user selection, device programming or otherwise.

Where operation is in D Band only, the device enters the Listening Phase for D Band as illustrated by operation block 175. For example, in one embodiment when configured for D Band in a given network, the device follows a conventional D Band listening process for the D Band. As a further example, if the device is a MoCA device, the device follows a conventional process for the D Band Listening Phase for MoCA devices.

Where operation is in E Band only, the device enters the Listening Phase for E Band as illustrated by operation block 173. For example, in one embodiment when configured for E Band in a given network, the device follows a conventional E Band listening process for the E Band. As a further example, if the device is a MoCA device, the device follows a conventional process the E Band Listening Phase for MoCA devices. Using a conventional process for each individual channel for the Listening Phase allows the network device to conduct listening operations without requiring changes to the standard beaconing process for the network.

As a result of the listening operation performed by the network device at either of operations 168, 173, 175 (or other operation, depending on the number of frequency bands to be scanned), the network device can join a detected network or form a new network with other devices detected on one or more channels. This is illustrated by operation 178. If the device forms or joins a network, the operation is completed and the device can enter its normal operational mode. If the device fails to join an existing network or form a new one, the device proceeds to the Beacon Phase. This is illustrated by process flow 180. In some embodiments, the Listening Phase can be repeated one or more times if the network device is unsuccessful detecting, joining or forming a network.

Figure 3:
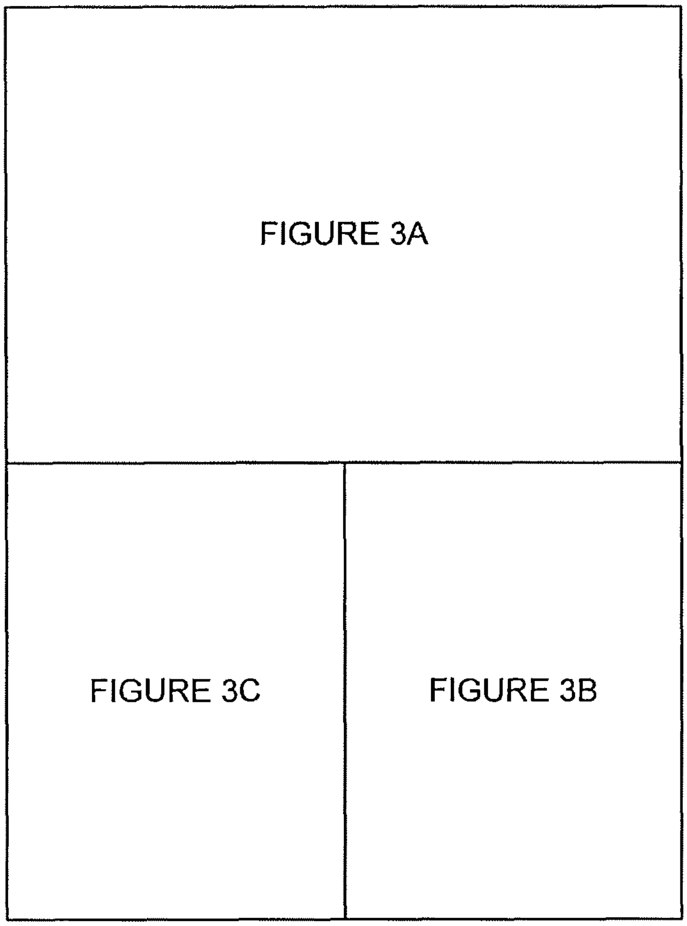
FIG. 3, which comprises
Figure 3A:
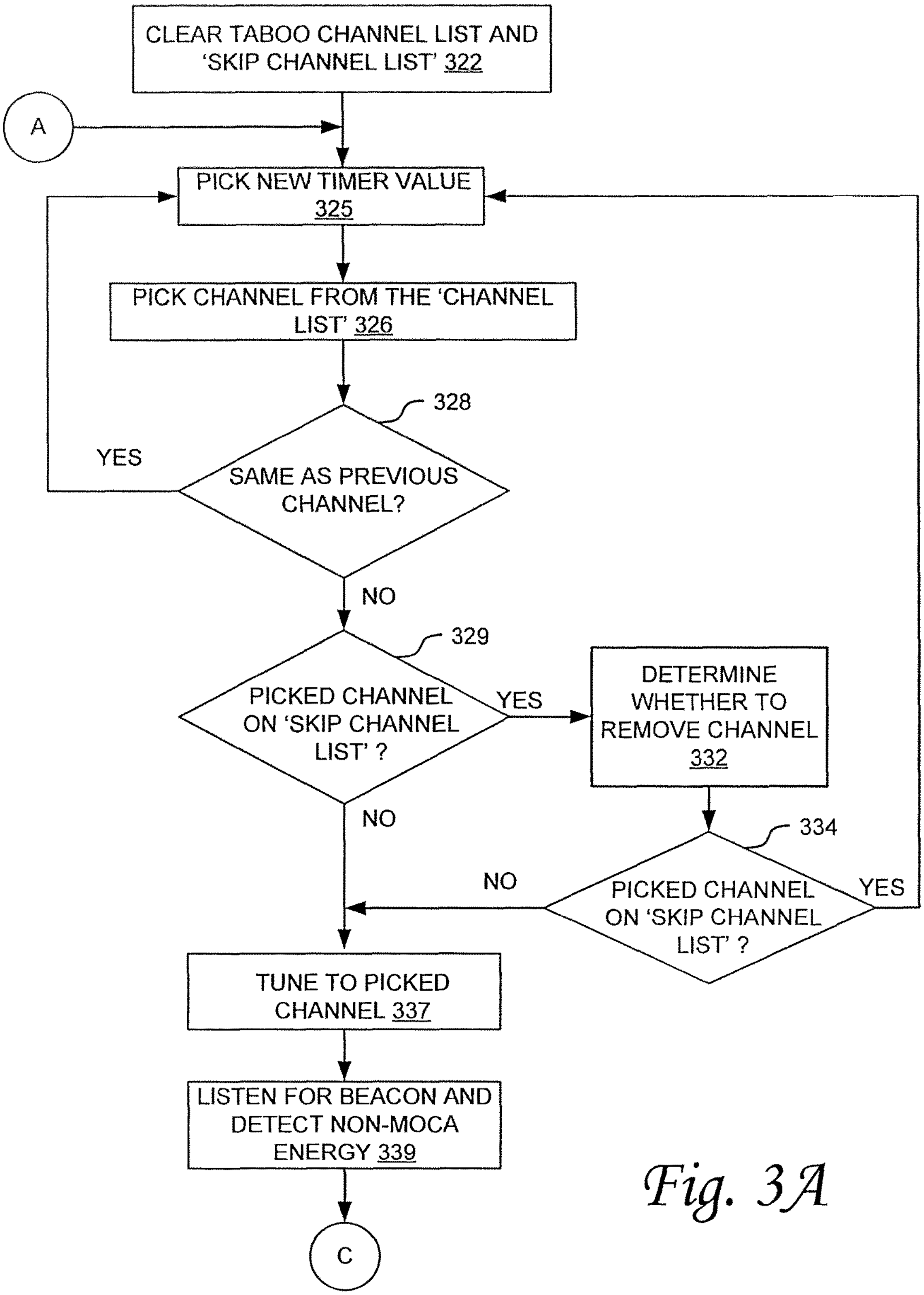
FIGS. 3A, 3B and 3C, is a diagram illustrating an example Beacon Phase in accordance with one embodiment of the systems and methods described herein.
Figure 3B:
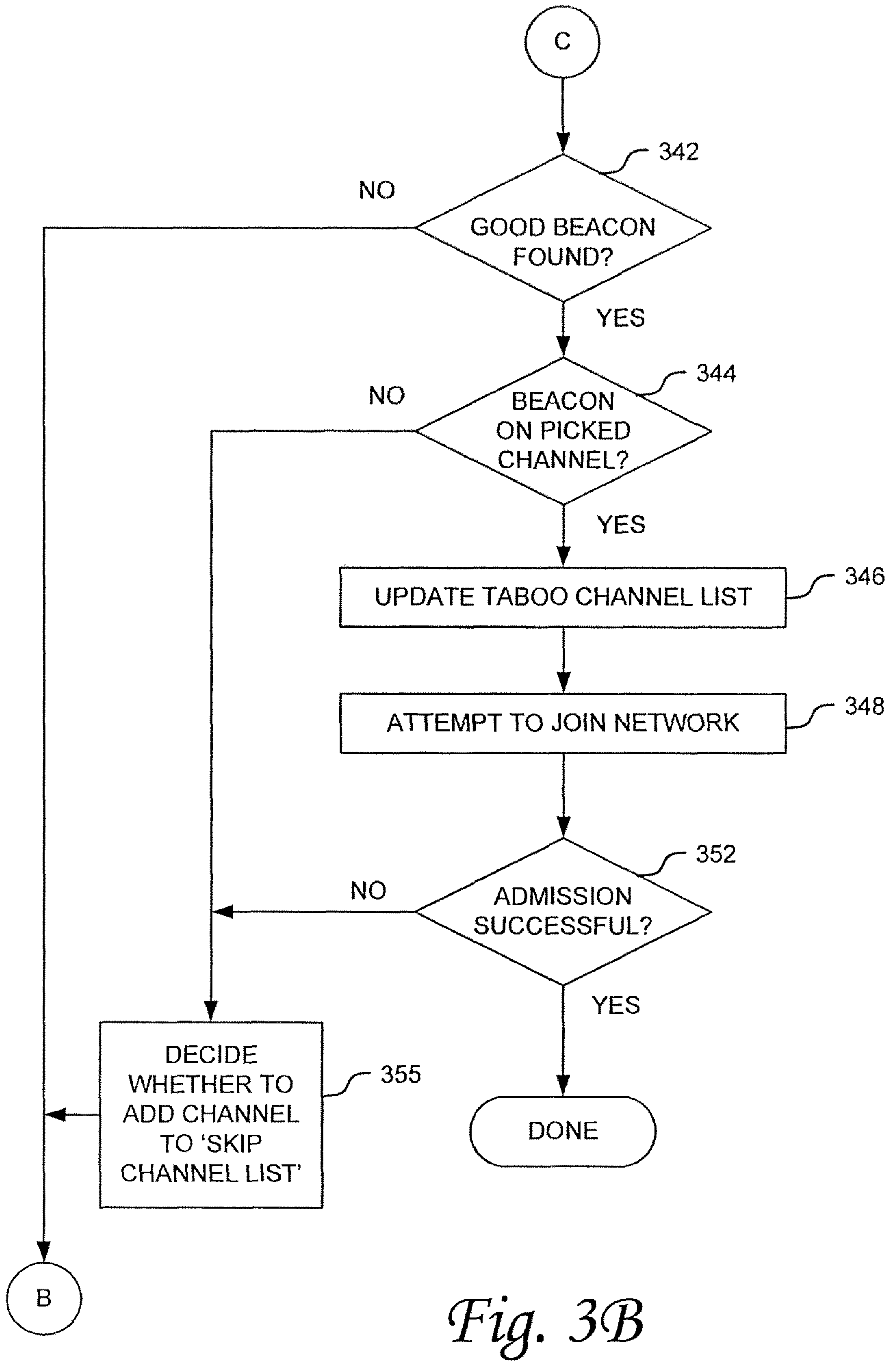
Figure 3C:
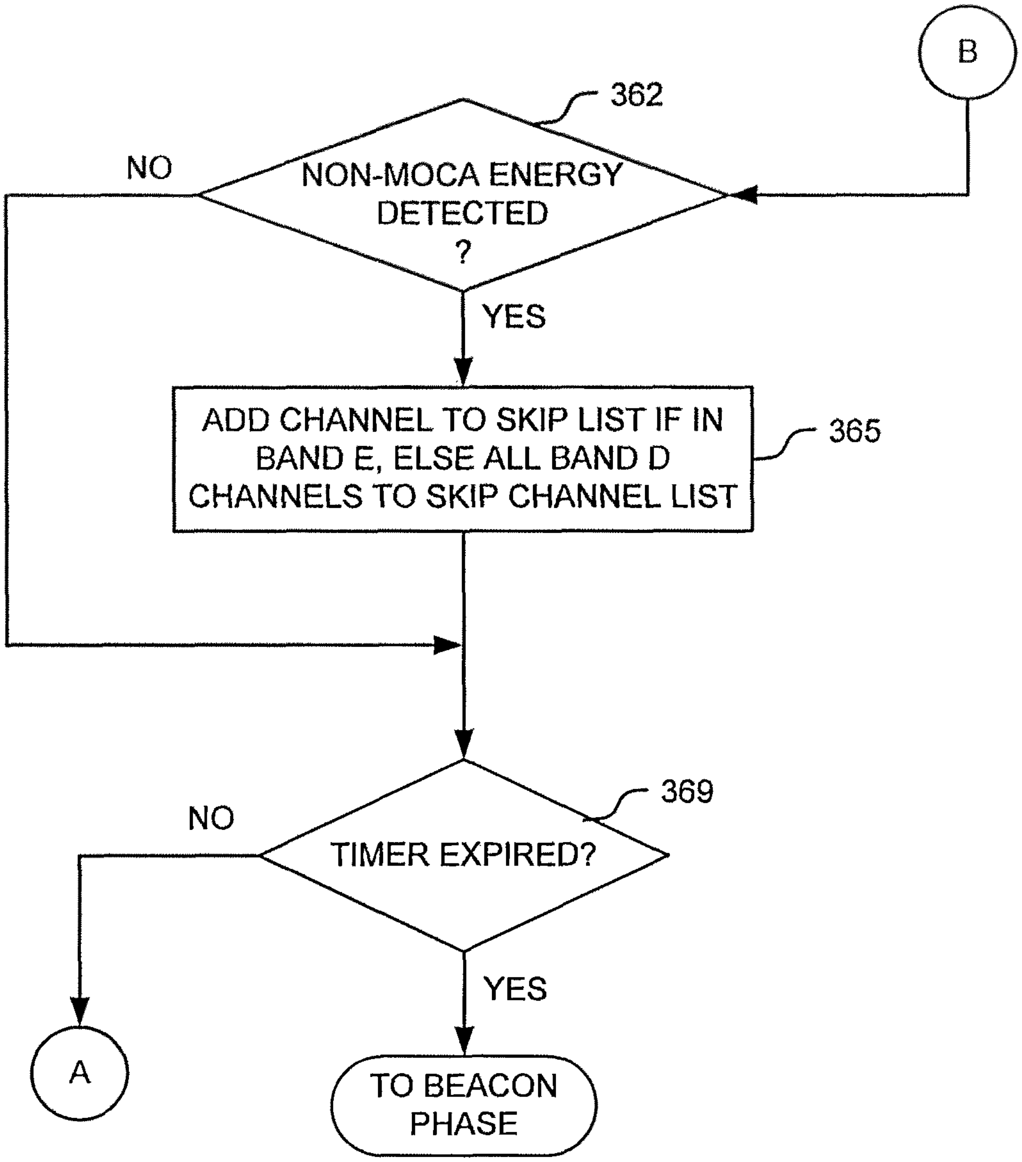

An example process for the Listening Phase is now described. FIG. 3, which comprises FIGS. 3A, 3B and 3C, is a diagram illustrating an example Listening Phase in accordance with one embodiment of the systems and methods described herein. Referring now to FIG. 3, at operation 322 the network device clears its list of Taboo channels (Taboo channel list) and its list of channels to avoid or skip (skip channel list, or banned channel list).

Taboo channels in MoCA are a set of frequencies adjacent to a selected operation frequency. They are marked as taboo or banned channels to indicate that other MoCA networks should not form on these frequencies to avoid interference. Each node in a MoCA network defines a set of taboo frequencies depending on channel selectivity and presumed characteristics of other MoCA devices in the network. The purpose of the taboo frequencies is to prevent one MoCA network from interfering with another nearby network operating on a different frequency.

At operation 325, a new timer value is selected. The timer value is a random time selected by a Node in a predetermined range (e.g. between 400 msec and 2800 msec) and is used by the Node during Network Search to listen for beacons on a channel before trying to send its own beacons on that channel.

At operation 326, a channel is chosen from the network device's channel list. At operation 328, the network device checks to determine whether the chosen channel is the same as in previous channel on which beacon operations were already performed. If the selected channel is indeed a channel on which beacon operations were already performed, the process reverts back to operation 325 and a new timer value is selected, or the timer is restarted for the next channel. If it is determined in step 328 that the selected channel is not the same as the previous channel, the network device checks the selected channel to determine whether the selected channel is on the Skip channel list. This is illustrated by operation 329. If the selected channel is on the Skip channel list, the process proceeds to operation 332 at which the network device determines whether to remove the selected channel from the Skip channel list.

If the channel is not removed from the skip channel list, the process returns to step 325 at which a new timer value is selected, or the timer is restarted for the next channel. If, on the other hand, the channel is removed from the Skip channel list, (as determined at operation 334) the process continues at operation 337 where the network device tunes its radio tuners to the selected channel.

Once tuned to the selected channel, the network device uses its radio to listen for the beacon of another network device on that channel, and to detect non-MoCA energy. This is illustrated by operation 339.

At this point, the process continues at operation 342 (FIG. 3B) where the network device determines whether the beacon detected is a good beacon for a MoCA device. If it is a good beacon for a MoCA device, the process continues at operation 344 where the network device determines whether the beacon detected is on the picked channel. If it is on the picked channel, the network device updates the taboo channel list at operation 346, and attempts to join the network at operation 348. If admission is successful (illustrated by decision operation 352) the device is admitted to a network and the process is complete. If, on the other hand, admission is not successful, at operation 355 the network device determines whether or not to add this channel to its Skip channel list.

If a good beacon is not found, the located beacon is not on the picked channel, or admission to the network is unsuccessful (after a determined number of attempts), the process continues at operation 362 (FIG. 3C) where the device determines whether non-MoCA energy is detected.

If non-MoCA energy is detected, the channel is added to the Skip channel list so that it can be avoided for MoCA operations. This is to avoid interference with satellite or cable TV signals. In continuing with the example of E Band and D Band as described above, if the energy detected is in the D Band, in one embodiment all channels in the D Band are added to the Skip channel list. This is because satellite TV signals in the D Band tend to use all or almost all of the channels in the D Band. On the other hand, if the detected energy is in an E Band channel, only the channel in which the energy is detected is added to the skip channel list.

At operation 369, the timer is checked to determine whether a predetermined amount of time has elapsed. If so, the operation continues to the Beacon Phase. If the predetermined amount of time has not elapsed, the process returns to operation 325 at which point a new timer value is selected, or the timer is restarted for the next channel, and another channel is evaluated and scanned.

Figure 4:
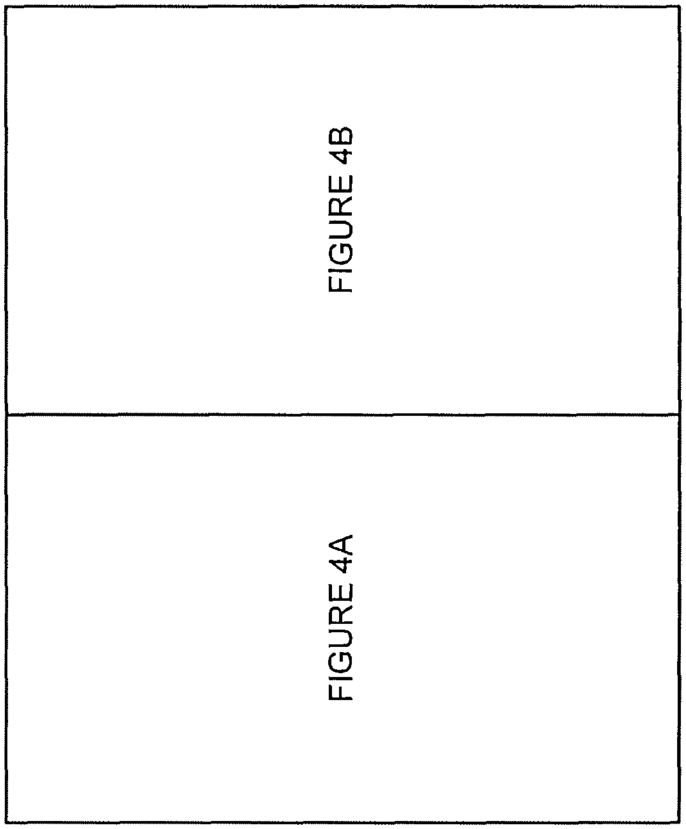
FIG. 4, which comprises
Figure 4A:
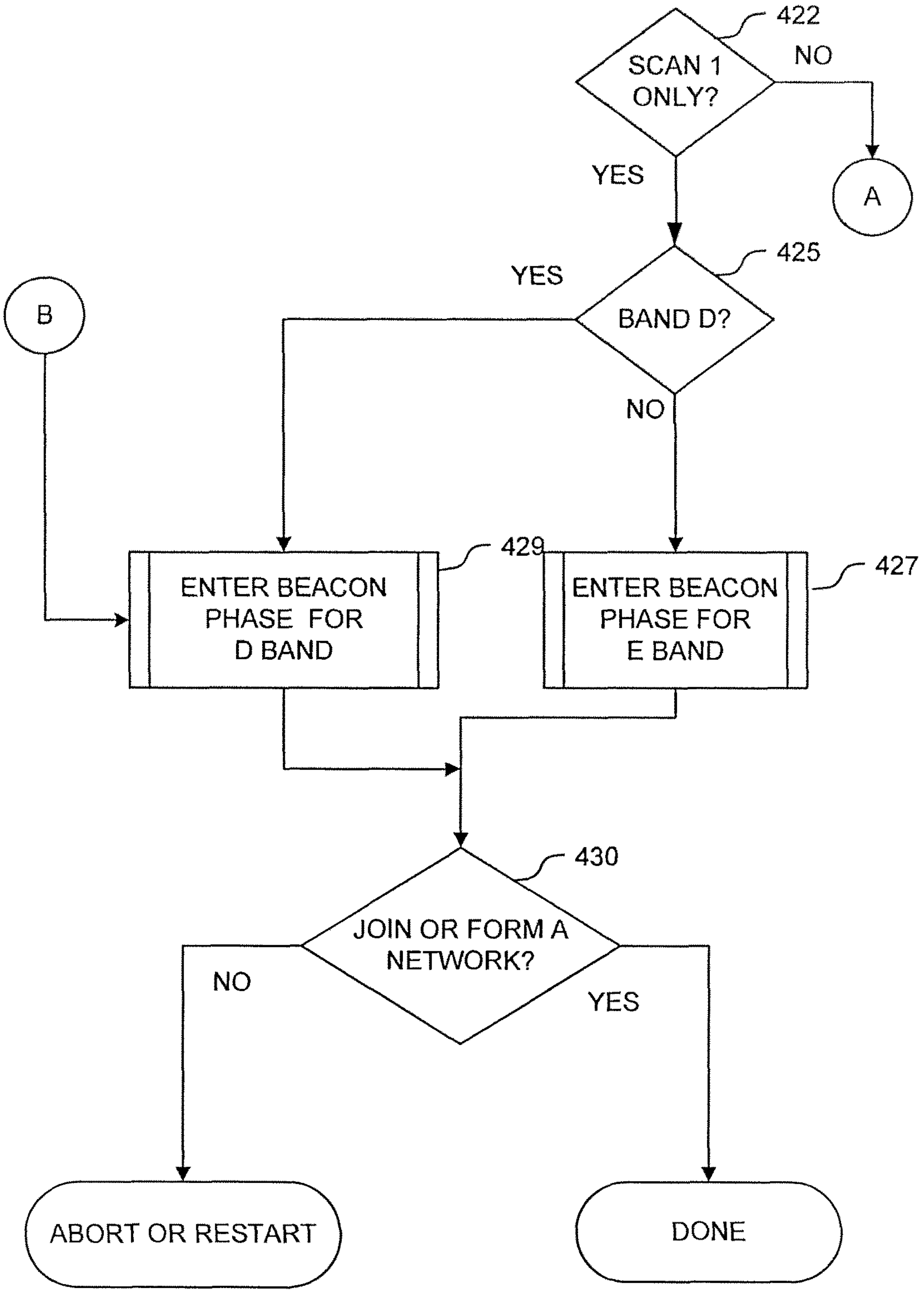
FIGS. 4A and 4B, is a diagram illustrating an example process for the Beacon Phase in accordance with one embodiment of the systems and methods described herein.
Figure 4B:
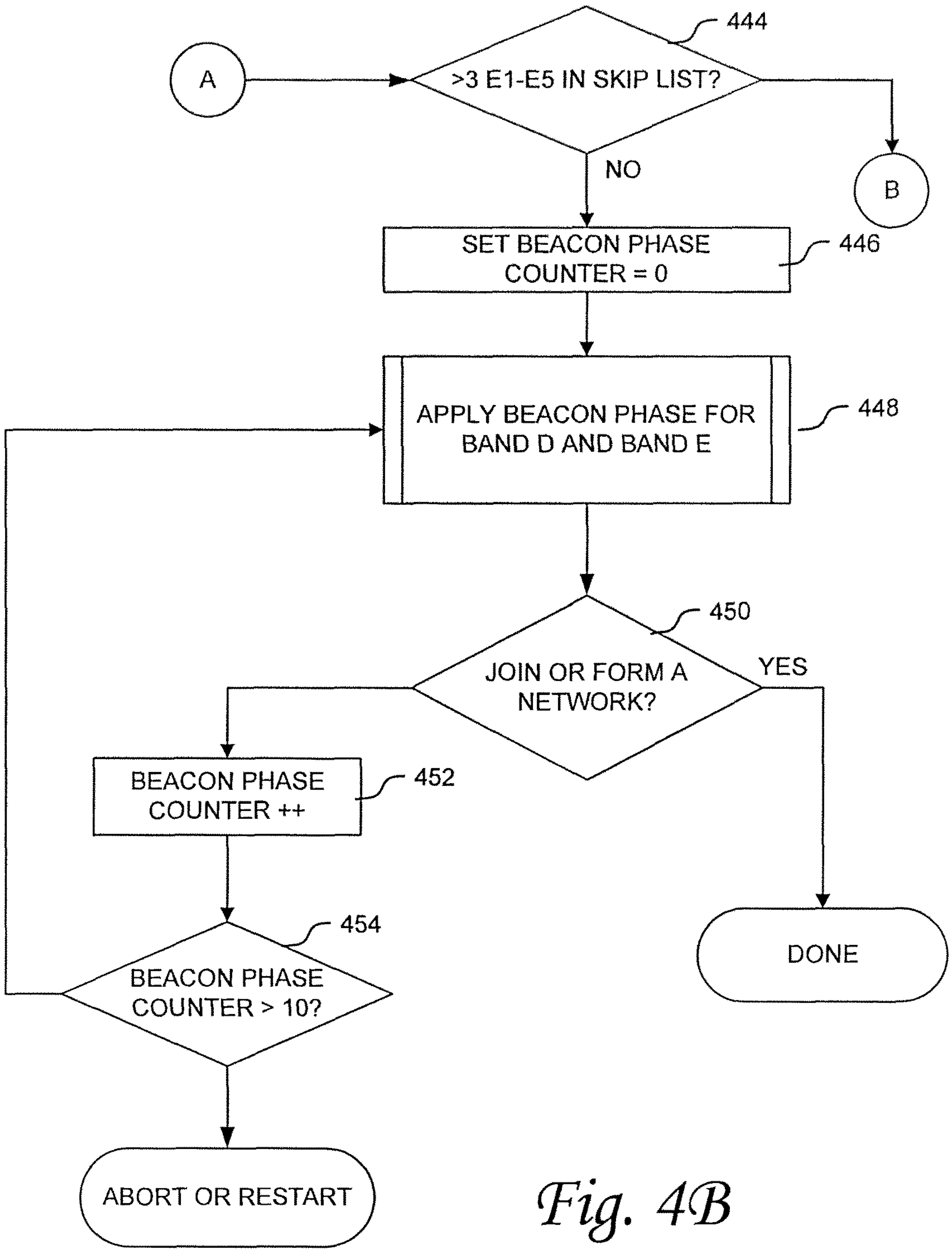

FIG. 4, which comprises FIGS. 4A and 4B, is a diagram illustrating an example process for the Beacon Phase in accordance with one embodiment of the systems and methods described herein. Referring now to FIG. 4, the device determines whether it is configured to scan one band, or more than one band. This is illustrated by operation decision block 422.

Where operation is in one band (i.e., an affirmative result at decision block 422), the network node determines which of the plurality of bands it is going to be operating in. This is illustrated by decision block 425. This decision may be determined based on user selection, device programming or otherwise.

Where operation is in E Band only, the device enters the Beacon Phase for E Band as illustrated by operation block 427. Likewise, where operation is in D Band only, the device enters the Listening Phase for D Band as illustrated by operation block 429. In one embodiment, the device follows a conventional or usual process used for the Beacon Phase for single-band operation in the given network. For example, for a device configured for operation in a particular network, the device is configured to be compliant with applicable network specifications for single band operation in that network. As a further example, for a device configured for operation in MoCA networks, the device is configured to perform the Beacon Phase so as to be compliant with MoCA specifications for single band operation in a MoCA network.

As a result of the beaconing operation performed by the network device, the network device can join a detected network or form a new network with other devices detected on one or more channels. This is illustrated by operation 430. If the device forms or joins a network, the operation is completed and the device can enter its normal operational mode. If the device fails to join an existing network or to form a new one, the device aborts or restarts the process. In some embodiments, the Beacon Phase can be repeated one or more times if the network device is unsuccessful detecting, joining or forming a network.

If at operation 422 it is determined that more than one band is being configured for scanning, operation continues at block 444 where the multi-band beaconing procedure is begun. In the illustrated example process, the first operation 444 is to check to determine whether four or more E Band channels are in the Skip channel list. If there are four or more E Band channels in the skip channel list, the Beacon Phase is not performed for the E Band and the operation returns to step 429 or the Beacon Phase is entered for D Band only.

If there are not four or more E Band channels in the Skip channel list, the process continues at operation 446 where a Beacon Phase counter is initialized to zero. Then, at operation 448, phase beaconing is performed. In one embodiment, this beaconing is performed using conventional network beaconing operations, but applying the Channel List defined as a union of the Channel List in the D and E Bands. In some embodiments, the channel picking order is as defined in Tables 1-3, although other channel picking orders can be specified. Using conventional beaconing operations for each individual band for the Beacon Phase allows the network device to conduct beaconing operations without requiring changes to the standard beaconing process for the network.

Also, in dual-band mode, when the tuned frequency (MHz) is in Band D, the TABOO_CHN_MASK_START and the TABOO_CHN_MASK fields of broadcasted Beacons are the same as these specified in the network search algorithm in "MoCA MAC/PHY SPECIFICATION v1.0", November, 2007.

Also, in dual-band mode, beacon channels can be configured as being programmable and configurable by a user via a user interface on which channel(s) of Band D and Band E are Beacon Channels. In some embodiments, the following constraints can be applied: (1) Band E has exactly one Beacon Channel with E4 as the default; and (2) Band D has at least one Beacon Channel with D1-D8 as the default set of Beacon Channels in Band D. In addition, the last operating frequency in Band D (if not NULL and not configured to be a non-beacon channel) is always a Beacon Channel.

As a result of the beaconing operation performed by the network device, the network device can join a detected network or form a new network with other devices detected on one or more channels. This is illustrated by operation 450. If the device forms or joins a network, the operation is completed and the device can enter its normal operational mode. If the device fails to join an existing network or form a new one, the device increments (or decrements for a count-down timer) its Beacon Phase counter and continues the process at operation 448 for a predetermined number of times. This is illustrated by operations 452 and 454. As depicted in the illustrated example embodiment, the predetermined number of times the process is repeated is 10, although other repetition values can be selected.

Figure 7:
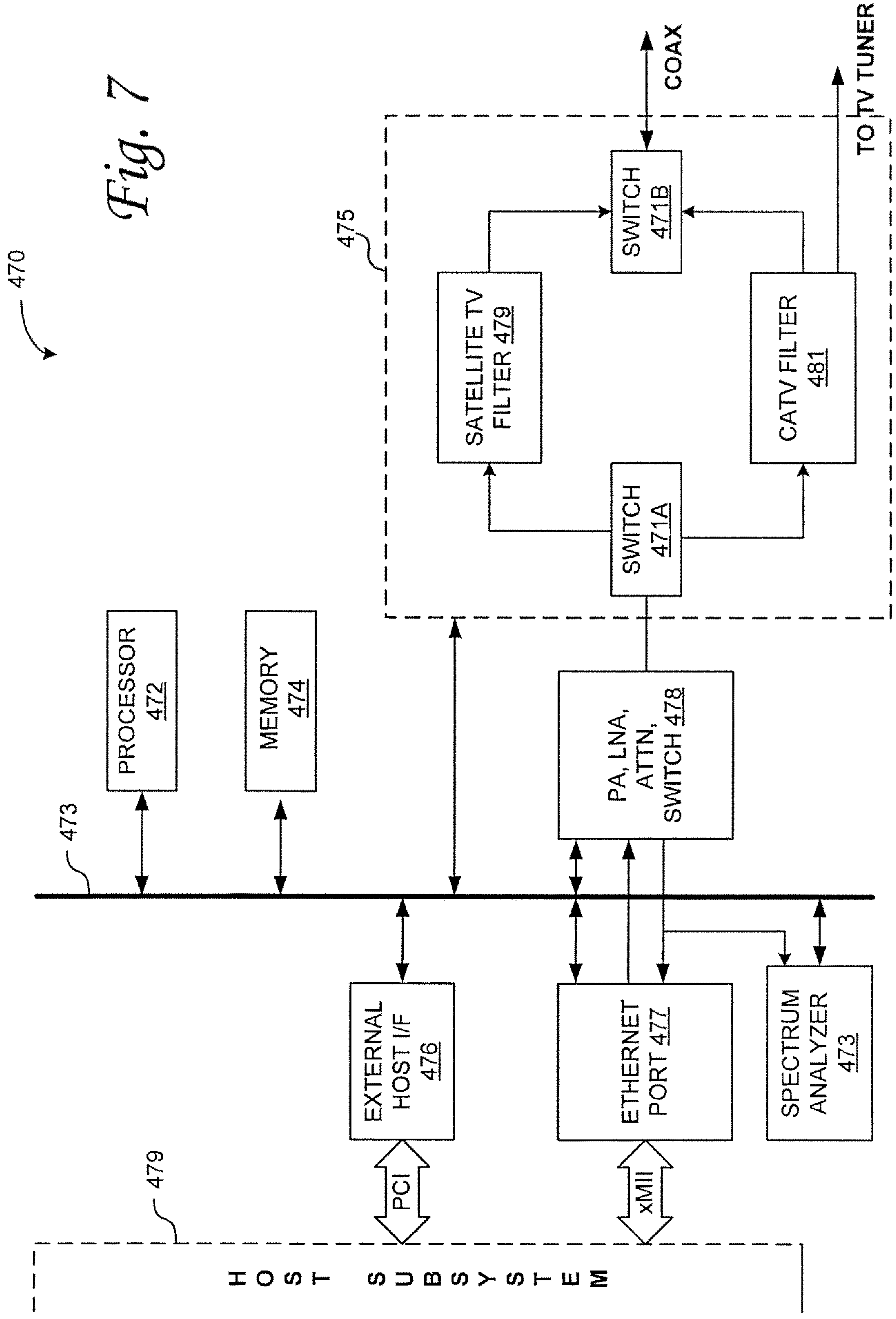
FIG. 7 is a diagram illustrating an example implementation of a network device configured to perform the listening and beaconing phases and to configure for network communications in accordance with one embodiment of the systems and methods described herein.

FIG. 7, is a diagram illustrating an example implementation of a network device configured to perform the listening and beaconing phases and to configure for network communications in accordance with one embodiment of the systems and methods described herein. Referring now to FIG. 7, the network device 470 in this example includes a processor 472, memory 474, other storage devices (not illustrated), an external host interface 476, an Ethernet port 477, a PA, LNA, Attenuator and Switch 478, a spectrum analyzer 473 and a switch/filter arrangement 475. The switch filter arrangement 475 includes two switches 471A, 471B, a satellite TV filter 479 and a Cable TV filter 481.

Processor 472, memory 474, other storage devices and bus 473 can be implemented, for example, as described in detail below with reference to FIG. 8. For example, Memory 474 in the illustrated example is configured to store data and other information as well as operational instructions such as network module control routines. The processor 472, which can be implemented as a CPU for example, is configured to execute instructions or routines and to use the data and information in memory 474 in conjunction with the instructions to control the operation of the network device 470. For example, such routines can include instructions to enable processor 472 to perform normal network device operations for data and signal communications.

Spectrum analyzer 473 can be implemented as a dedicated spectrum analyzer or as part of the functions performed by processor 472. Spectrum analyzer 473 can include a receiver to receive network signals present on the coax and a signal processor (for example, a digital signal processor) to analyze and evaluate the detected signals. For example, in some embodiments, spectrum analyzer 473 is used to measure the noise floor on a given channel, measure signal energy present on the given channel and determine whether the signal energy measured is above the noise floor by a threshold amount. This can be done to determine whether the energy received is actually signal energy such as a satellite or cable TV signal, or simply noise or interference. Signal energy detected can include non-network signal energy (non-MoCA signal energy in the case of MoCA applications) such as a satellite or cable TV signal.

External host interface 476 an Ethernet port 477 can be included and are used to communicate with host subsystem 479. In the illustrated example, external host interface 476 communicates with host subsystem 479 via a PCI interface or Ethernet port 477 communicates with host subsystem 479 via an xMII interface. As would be apparent to one of ordinary skill in the art after reading this description, alternative interfaces can be used.

PA, LNA, Attenuator and Switch 478 provides communication interface with the coaxial cable or the TV tuner via switching or diplexer system 475. Switches 471A, 471B are used to provide switching of the communication signals through the appropriate bandpass filter 479 or diplexer 481. Switches 471A, 471B can be controlled by signals from the processor, for example, based on the frequency band selected for operation.

Satellite TV filter 479 implemented, for example, as a band pass filter, diplexer, or other like device to pass satellite TV signals in the appropriate frequency band for the given application. For example, these can be E Band signals. The cable TV filter 481 can be implemented in two parts, a low-pass filter to pass CATV signals to a TV tuner and a MoCA D band bandpass filter, which passes D band signals from the coax to the PA/LNA. In operation, the filters are selected by processor 472 for each channel tuned in the Listening and Beacon Phases. Once the device has detected the presence of a MoCA network on one of the appropriate frequency bands in the environment (D or E Band), processor 472 configures switching unit 475 for operation in the appropriate frequency band.

Where components or modules of the invention are implemented in whole or in part using software, in one embodiment, these software elements can be implemented to operate with a computing or processing module capable of carrying out the functionality described with respect thereto. An example of this is the computing module included in the network device 470, which includes processor 472, memory 474, bus 473, inter alia. One example computing module is shown in more detail in FIG. 8. Various embodiments are described in terms of this example-computing module 500. After reading this description, it will become apparent to a person skilled in the relevant art how to implement the invention using other computing modules or architectures.

Figure 8:
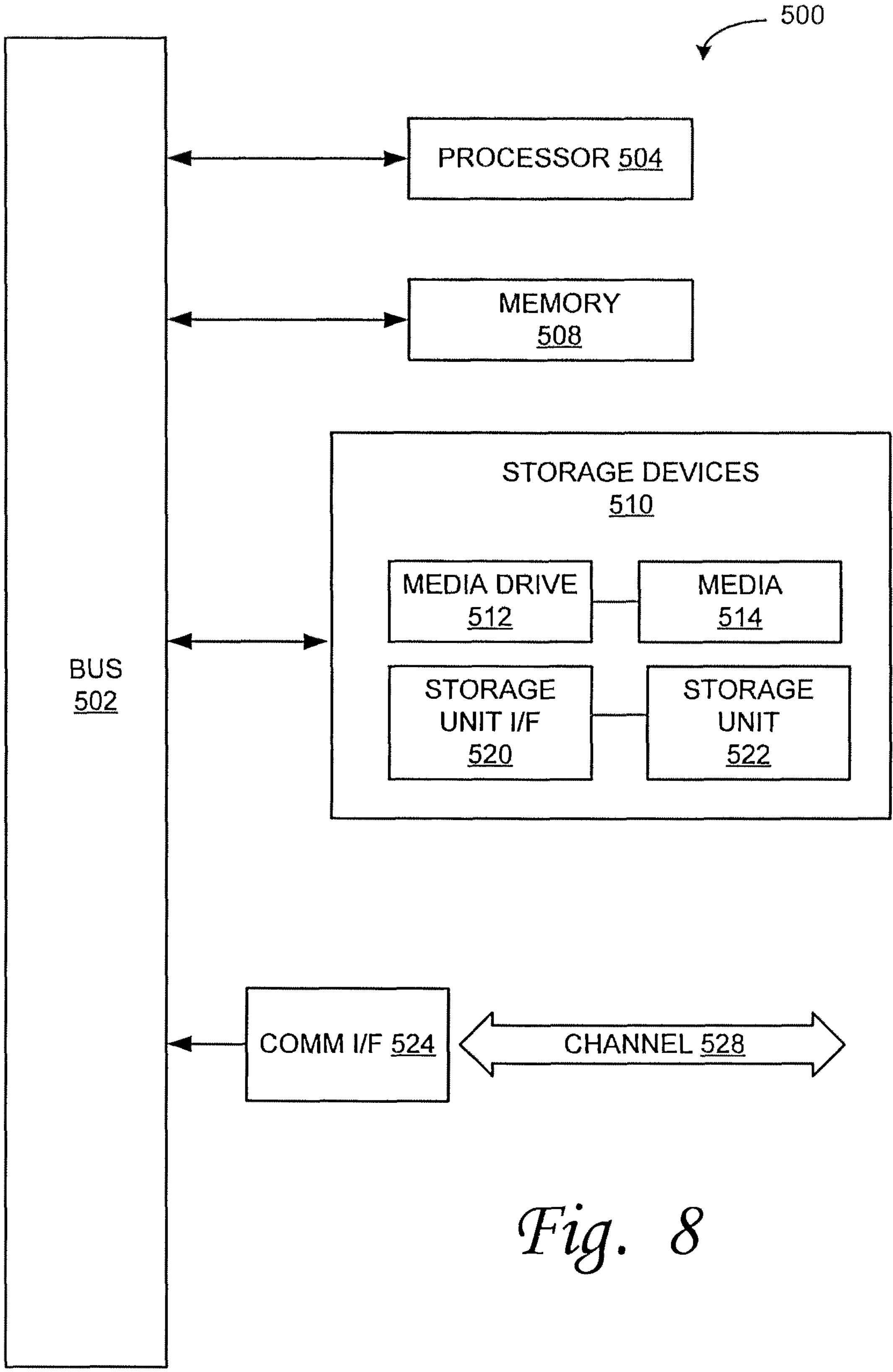
FIG. 8 is a diagram illustrating one example of a computing module in accordance with one embodiment of the systems and methods described herein.

Referring now to FIG. 8, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, and storage devices such as storage unit 520, and media 514. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

Although the systems and methods set forth herein are described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "an" should be read as meaning "at least one," "one or more" or the like; and adjectives such as "conventional," "traditional," "normal," "standard," "known" and terms of similar meaning should not be construed as limiting the item described to a given time period or to an item available as of a given time. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method performed in a network device for self-configuring the network device for operation in a MoCA communication network, the method comprising, without user intervention and prior to the network device attempting to form its own communication network:

scanning a first plurality of communication channels in a first frequency band associated with cable TV signals and scanning a second plurality of communication channels in a second frequency band separate from the first frequency band and associated with satellite TV signals;

determining whether a signal detected in a first communication channel of the first and second pluralities of communication channels is a beacon of the communication network;

if the detected signal is a beacon of the communication network, then attempting to join the communication network on the first communication channel;

determining whether the detected signal is from a non-MoCA device; and if the detected signal is from a non-MoCA device, then adding the first communication channel to a list of banned channels.

2. The method of claim 1, wherein said determining whether the detected signal is from a non-MoCA device comprises:

utilizing first determining criteria if the first communication channel is a channel of the first plurality of communication channels; and utilizing second determining criteria, different from the first determining criteria, if the first communication channel is a channel of the second plurality of communication channels.

3. The method of claim 1, wherein the beacon comprises a MoCA beacon and further comprising updating the list of banned channels when the MoCA beacon is detected on the first communication channel.

4. The method of claim 1, comprising selectively entering a Beacon Phase in either of the first and second frequency bands to form a network.

5. The method of claim 1, wherein:

the first frequency band comprises at least the MoCA E Band of MoCA-1_1-Extentions-Band-E-v100714;

the second frequency band comprises at least the MoCA D Band of MoCA MAC/PHY SPECIFICATION v1.0; and the first and second pluralities of communication channels scanned comprise the union of the channels of said E Band and said D Band.

6. The method of claim 1, wherein the first and second pluralities of communication channels are scanned one at a time in a successive order, and wherein a last operating frequency is scanned between scanning of every M of the communication channels, where M is an integer value and less than a total number of channels scanned, such that the last operating frequency is scanned more frequently than the other communication channels of the first and second pluralities of communication channels.

7. The method of claim 1, wherein the first and second pluralities of communication channels are scanned one at a time, and wherein:

if a last operating frequency of the network device is in the first frequency band, then all of the channels of the first frequency band are scanned once before any of the channels of the second frequency band; and if the last operating frequency of the network device is in the second frequency band, then all of the channels of the second frequency band are scanned once before any of the channels of the first frequency band.

8. The method of claim 6, wherein M is in the range 3-6.

9. The method of claim 1, comprising if the detected signal is detected in a channel of the first frequency band, then analyzing signal strength in only the channel of the first frequency band; and if the detected signal is detected in a channel of the second frequency band, then analyzing signal strength in at least a portion of the channel of the second frequency band and in at least a portion of another channel adjacent to the channel of the second frequency band.

10. The method of claim 1, comprising:

if the detected signal is detected in a channel of the first frequency band, then comparing signal strength to a first threshold to determine whether the detected signal is strong enough to qualify as a detected signal; and if the detected signal is detected in a channel of the second frequency band, then comparing signal strength to a second threshold, lower than the first threshold, to determine whether the detected signal is strong enough to qualify as a detected signal.

11. The method of claim 1, wherein:

in the first frequency band, a −58 dBm signal is determined to be a detected signal, and a −68 dBm signal is determined to be a false detection; and in the second frequency band, a −69 dBm signal is determined to be a detected signal, and a signal of −80 dBm signal is determined to be a false detection.

12. A self-configuring network device for operation in a MoCA communication network, the network device comprising:

a processor; and a memory communicatively coupled to the processor and storing program instructions that when executed by the processor, cause the network device, without user intervention and prior to the network device attempting to form its own communication network, to at least:

scan a first plurality of communication channels in a first frequency band associated with cable TV signals and scan a second plurality of communication channels in a second frequency band separate from the first frequency band and associated with satellite TV signals;

determine whether a signal detected in a first communication channel of the first and second pluralities of communication channels is a beacon of the communication network;

if the detected signal is a beacon of the communication network, then attempt to join the communication network on the first communication channel;

determine whether the detected signal is from a non-MoCA device; and if the detected signal is from a non-MoCA device then add the first communication channel to a list of banned channels.

13. The network device of claim 12, wherein the processor comprises a general purpose processor and a digital signal processor.

14. The network device of claim 12, wherein the network device determines whether the detected signal is from a non-MoCA device by, at least in part:

utilizing first determining criteria if the first communication channel is a channel of the first plurality of communication channels; and utilizing second determining criteria, different from the first determining criteria, if the first communication channel is a channel of the second plurality of communication channels.

15. The network device of claim 12, wherein the beacon comprises a MoCA beacon and the network device updates the list of banned channels when the MoCA beacon is detected on the first communication channel.

16. The network device of claim 12, wherein the program instructions further include program instructions configured to cause the network device to selectively enter a Beacon Phase in either of the first and second of frequency bands to form a network.

17. The network device of claim 12, wherein:

the first frequency band comprises at least the MoCA E Band of MoCA-1_1-Extentions-Band-E-v100714;

the second frequency band comprises at least the MoCA D Band of MoCA MAC/PHY SPECIFICATION v1.0; and the first and second pluralities of communication channels scanned comprise the union of the channels of said E Band and said D Band.

18. The network device of claim 12, wherein the first and second pluralities of communication channels are scanned one at a time in successive order and wherein a last operating frequency is scanned between scanning of every M of the communication channels, where M is an integer value and less than a total number of channels scanned, such that the last operating frequency is scanned more frequently than the other communication channels of the first and second pluralities of communication channels.

19. The network device of claim 12, wherein the first and second pluralities of communication channels are scanned one at a time, and wherein:

if a last operating frequency of the network device is in the first frequency band, then all of the channels of the first frequency band are scanned once before any of the channels of the second frequency band; and if a last operating frequency of the network device is in the second frequency band, then all of the channels of the second frequency band are scanned once before any of the channels of the first frequency band.

20. The method of claim 1, wherein said scanning comprises alternating between a last operating frequency and successive channels in the first and second frequency bands.

21. The network device of claim 12, wherein the network device scans the first and second pluralities of communication channels by, at least in part, alternating between a last operating frequency and successive channels in the first and second frequency bands.

22. The method of claim 1, comprising if the detected signal is from a non-MoCA device and the first communication channel is in the second frequency band that is associated with satellite TV signals, then adding all channels in the second frequency band to the list of banned channels.

23. The network device of claim 12, wherein the program instructions further comprise program instructions configured to cause the network device to, if the detected signal is from a non-MoCA device and the first communication channel is in the second frequency band associated with satellite TV signals, then add all channels in the second frequency band to the list of banned channels.

24. The method of claim 22, comprising if the detected signal is from a non-MoCA device and the first communication channel is in the first frequency band that is associated with cable TV signals, then only adding the first communication channel to the list of banned channels.

25. The network device of claim 23, wherein the program instructions further comprise program instructions configured to cause the network device to, if the detected signal is from a non-MoCA device and the first communication channel is in the first frequency band that is associated with cable TV signals, then only add the first communication channel to the list of banned channels.

* * * * *